Jan. 30, 1940.  D. B. KNIGHT  2,188,476
REFRIGERATION
Filed Feb. 7, 1931

Inventor,
D. B. Knight
A. Yates Dowell
By  Atty.

Patented Jan. 30, 1940

2,188,476

UNITED STATES PATENT OFFICE 2,188,476

REFRIGERATION

Donald B. Knight, Brooklyn, N. Y., assignor, by mesne assignments, to Servel, Inc., Dover, Del., a corporation of Delaware Application February 7, 1931, Serial No. 514,120

23 Claims. (Cl. 62—125)

This invention relates to the art of refrigeration and more particularly to a method of and means for transferring heat to a place remote from its source.

Heretofore heat has been transferred through the medium of a volatile fluid flowing in a closed circuit in which the volatile fluid is evaporated by heat in one portion and condensed in another portion, but an undesirable limitation on such practice has been either that the heat to be transferred by the fluid had to be applied below the level at which the fluid was condensed so that the liquid fluid would flow back by gravity or that the arrangements work intermittently or require mechanical devices.

It is an object of this invention to utilize flow of volatile fluid for transference of heat and to condense the fluid below the level at which it is vaporized, without the complication or weaknesses of previously proposed systems.

Another object of the invention is to provide cooling of a condenser and/or an absorber by a cooling source at a low level relative to the absorber or condenser. Another object is to provide a preferably continuous transfer system for cooling a body at a high elevation relative to the source of cold and utilizing vapor lift action.

Figure 1:
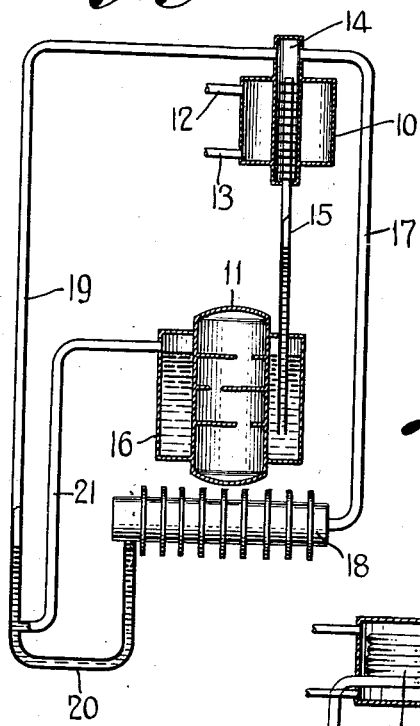
Figure 2:
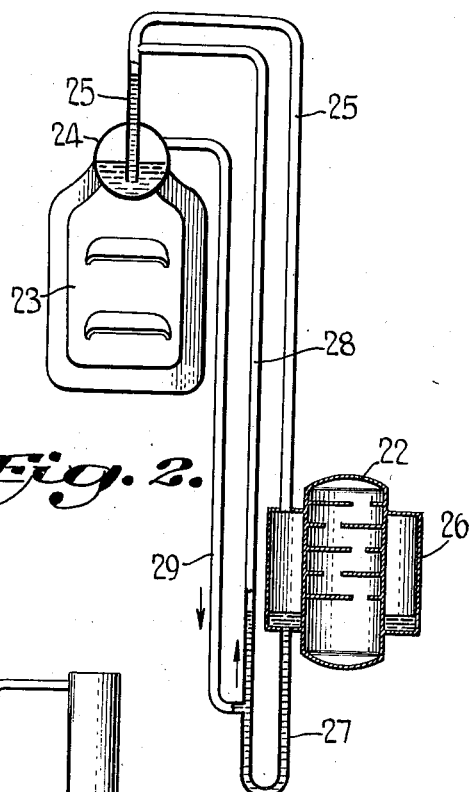
Figure 3:
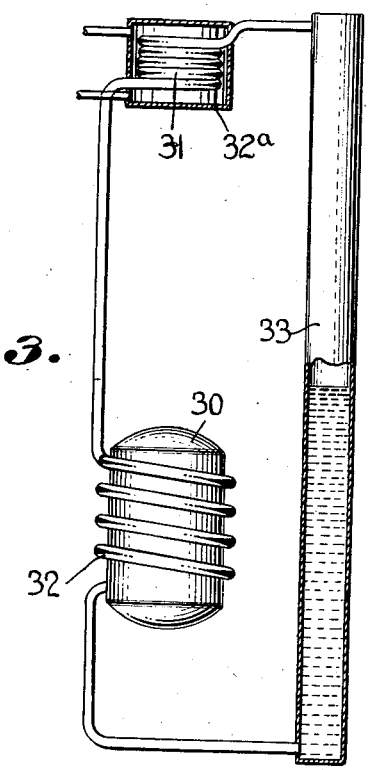

Further objects and advantages will be apparent from the following description taken in connection with the accompanying drawing wherein Fig. 1 is a diagrammatic view illustrating the invention applied to the cooling of an absorber and a condenser of an absorption refrigerating apparatus;

Fig. 2 shows another embodiment of the invention in which heat is transferred from a higher elevation evaporator to an evaporator of a refrigerating system disposed at a lower level; and Fig. 3 is a diagrammatic view of a modified arrangement for cooling an absorber and a condenser of an absorption refrigerating apparatus.

Referring to Fig. 1, there are shown a condenser 10 and an absorber 11 which are usual parts of an absorption type refrigerating system such as disclosed in U. S. Patent No. 1,609,334 granted December 7, 1926. According to the usual practice, the condenser 10 and the absorber 11 are cooled by a flow of water through cooling jackets or coils around these parts. According to this invention these parts are cooled by a volatile fluid flowing in a closed circuit and circulating continuously while the refrigerating system is in operation.

A U-tube reservoir 20 contains a quantity of liquid fluid and around the absorber 11 there is a fluid tight jacket 16 which contains another quantity of liquid fluid. The heat of absorption from the absorber 11 boils the liquid fluid in the jacket 16 and vapor is formed which passes under pressure through a conduit 21 which connects with the leg 19 of the U-tube 20 below the liquid level therein. The vapor passing upwardly through the conduit 19 raises or pumps liquid from the reservoir 20 upwardly in a well known manner and the vapor and liquid are discharged into the upper end of a chamber 14 which is in heat exchange relation with the condenser 10. The vapor passes on from the upper portion of chamber 14 through a conduit 17 to a condenser 18 which may be placed in any desired location as, for instance, outside of a refrigerator, where it may be cooled by air. The fluid is liquefied in the condenser 18 and returned to the U-tube reservoir 20. Condenser 10 may be considered a primary condenser and condenser 18 a secondary condenser.

The liquid raised into the upper portion of chamber 14 through the conduit 19 is trapped out and collects in the bottom of chamber 14. The height of the liquid level in chamber 14 is limited by an overflow pipe 15 which conducts liquid back to the jacket 16 around the absorber 11. Heat from the primary refrigerant flowing in condenser 10 through conduits 12 and 13 will vaporize some of the liquid in chamber 14 and the resulting vapor will pass along with the previously formed vapor through conduit 17 to the condenser 18.

Circulation of the fluid will occur as described when the weight of the liquid column in overflow pipe 15 is greater than the weight of the fluid column in conduit 19 above the connection of conduit 21. The absorber 11 is cooled by the removal of heat to boil the liquid in jacket 16 and the condenser 10 is cooled by the removal of heat to vaporize the liquid in chamber 14.

The refrigerating system including condenser 10 and absorber 11 may be considered as a primary refrigerating system and the heat transfer system including chamber 14 and secondary condenser 18 may be considered a secondary system.

In Fig. 3 there is shown a simplified apparatus for accomplishing the results just described. A cooling system is provided which comprises a coil 32 around an absorber 30, a condenser cooling coil 31, and a secondary condenser 33 connected in series to form a closed fluid circuit. The lower part of this circuit is filled with liquid to a level above the absorber cooling coil 32. The absorber 30 is cooled by the removal of heat to boil the liquid in coil 32 and the resulting vapor raises liquid upwardly through the condenser cooling coil 31 in a well known manner. The condenser 32a of a refrigerating system is cooled by the removal of heat to vaporize the liquid raised through the cooling coil 31. Vapor and unevaporated liquid pass from the coil 31 into the upper portion of condenser 33 which is suitably located as, for instance, on the outside of a refrigerator where it may be air cooled. In the condenser 33, the vapor is condensed and the cycle is repeated.

In Fig. 2 there is shown an arrangement whereby this invention is applied to the cooling of a refrigerating chamber by a secondary heat transfer system. The primary evaporator 22 may be of any type and is shown as the evaporator in a refrigerating system of the absorption type. A secondary evaporator 24 of the flooded type, including the usual ice trays 23, and a U-tube reservoir 27 each contains a quantity of liquid refrigerant. Heat from the region surrounding and the ice trays within the evaporator 24 is removed to vaporize the liquid refrigerant therein and the resulting vapor passes through a conduit 29 to raise liquid from the reservoir 27 up through conduit 28 which connects with a conduit 25 which has one end extending into the evaporator 24 below the normal liquid level therein. In conduit 25 liquid refrigerant is trapped out and descends into the evaporator 24 and the lifting or pumping vapor passes upwardly and through conduit 25 and into a jacket 26 around the primary evaporator 22. Heat is removed from the vapor in jacket 26 by the primary evaporator and condensation of the vapor occurs, the liquid returning from the bottom of the jacket 26 to the reservoir 27.

It will be obvious to those skilled in the art that various other changes may be made in the construction and arrangement without departing from the spirit of the invention, and therefore the invention is not limited to what is shown in the drawing and described in the specification but only as indicated in the following claims.

I claim:

1. In combination with an absorber and a condenser of an absorption type refrigerating apparatus, a cooling system comprising a fluid container in heat exchange relation with the absorber, a vapor and liquid separator above the absorber and in heat exchange relation with the condenser, a secondary condenser below the level of the absorber, a vapor liquid lift having a liquid supply connection to the secondary condenser, a vapor connection to said container, and a discharge connection to the separator, an overflow pipe extending upwardly into the separator and downwardly into said container, and a vapor conduit from the separator to the secondary condenser.

2. Cooling means for an absorber and a condenser of an absorption type refrigerating apparatus and comprising a volatile fluid in a secondary circuit having an upper portion including a liquid trap in heat exchange relation with the condenser and a lower portion consisting of a secondary condenser and a reservoir, said circuit including a vapor liquid lift for raising condensed fluid from the reservoir to the upper portion, and a fluid container connected to be supplied with unevaporated liquid from the trap and adapted to be heated by the absorber to supply vapor to said lift.

3. In combination with the evaporator of a refrigerating system, a secondary cooling system comprising a secondary evaporator, a condenser below the secondary evaporator, and adapted to be cooled by the primary evaporator, a separating chamber above the secondary evaporator, a vapor liquid lift having a liquid supply connection to the condenser, a vapor connection to the secondary evaporator and a discharge connection to the separating chamber, a conduit from the separating chamber extending into the secondary evaporator, and a vapor conduit from the separating chamber to the condenser.

4. In combination with a plurality of vertically spaced heat emitting bodies, cooling means comprising, a continuous circuit for cooling fluid including an evaporating portion in heat exchange relation with an upper body and a condensing portion below said evaporating portion, and a closed vessel in heat exchange relation with a lower body connected to receive liquid by overflow from said evaporating portion and deliver vapor to a rising portion of said circuit below the liquid level therein to raise liquid from said condensing portion to said evaporating portion.

5. A cooling system comprising a flooded type evaporator, a condenser below said evaporator, a discharge conduit for liquid from said condenser to said evaporator including a vapor trap and communicating with said evaporator below the liquid level therein, a conduit for gas from said trap to said condenser, and a connection for introducing vapor from said evaporator into said condenser discharge conduit below the liquid level therein to raise liquid from said condenser into said evaporator.

6. The method of circulating a volatile fluid which comprises condensing the fluid to liquid at a first level, vaporizing a portion of the condensed fluid, raising another portion of the condensed fluid with the vapor thus formed to a level above said first level, separating the raised condensed fluid from the lifting vapor, evaporating the condensed fluid at said upper level, and again condensing the vaporized fluid.

7. The method of circulating a volatile fluid which comprises condensing the fluid to a liquid at a first level, vaporizing a portion of the liquid, raising another portion of the liquid with the vapor thus formed to a level above said first level, separating the raised liquid from the lifting vapor, conducting the raised liquid to replace the first said portion, and condensing the lifting vapor.

8. A heat transfer arrangement for cooling an absorber and a condenser of an absorption refrigeration apparatus and including a vaporization-condensation system having all parts in permanently open fluid communication with each other and containing a volatile fluid, a condensation portion of said member being at a lower level than a vaporization portion thereof, said vaporization portion being arranged in thermal transfer relation with said condenser, and a second vaporization portion being arranged in thermal transfer relation with said absorber and constructed to supply vapor for raising liquid fluid to said first vaporization portion.

9. In a method of cooling an absorber and a condenser of an absorption refrigeration apparatus by vaporization of heat transfer fluid in thermal exchange relation therewith, that improvement which consists in condensing vaporous heat transfer fluid below the place of vaporization in thermal exchange relation with the condenser, and utilizing vapor formed in cooling of the absorber to raise liquid heat transfer fluid to said place of vaporization in thermal exchange relation with the condenser.

10. In a method of transferring heat with respect to a refrigerating apparatus, the improvement which consists in condensing a heat transfer fluid, producing a column of liquid heat transfer fluid below the place of condensation, lightening the liquid column by the presence of vaporous heat transfer fluid therein below the place of condensation to lift liquid above the condensate, producing vapor above the place containing condensate, producing circulation of the heat transfer fluid at least in part by the last mentioned vapor, and producing the last mentioned vapor by heat from a source other than the medium in heat exchange relation with the liquid being lifted.

11. In refrigerating apparatus, a part containing refrigerant and a heat transfer system partly filled with a volatile liquid and having a part in heat exchange relation with said refrigerant containing part, said system including a portion in which condensation takes place, a heat receiving portion above condensed liquid in the place of condensation and containing some of said volatile liquid and wherein vapor is produced for producing liquid circulation, and a vapor lift conduit for lifting liquid from below the place of condensation to above the condensed liquid, said vapor lift conduit being remote from the heat supply source for said heat receiving portion, the liquid being at least in part lifted by the vapor produced in said heat receiving portion.

12. A heat transfer closed fluid system partly filled with a volatile liquid and having a portion for evaporation of the volatile liquid at a given elevation, a portion for condensation of the vapor formed in the evaporation portion connected to the evaporation portion and situated at a second elevation below the first elevation, a rising conduit portion adapted to supply liquid upwardly to the evaporation portion, and a conduit portion unobstructedly connecting the condensing portion with the rising conduit portion so that vapor in the rising conduit portion causes rise of liquid therein by reaction against a column of liquid condensate.

13. The method of heat transfer with the aid of a closed fluid system partly filled with a volatile liquid which consists in evaporating the volatile liquid at a given elevation, conducting the vapor away from the place of evaporation, condensing said vapor at a second elevation below said given elevation, and lifting the condensate to the place of evaporation by vapor-lift action against a reaction head formed by a liquid column of the condensate unobstructedly influencing the riser column of liquid and vapor.

14. Refrigerating apparatus including an evaporator containing a volatile liquid, a condensing vessel situated below said evaporator and adapted to be cooled by a refrigerating system, a conduit having a lower opening below the liquid level in said evaporator and adapted to hold a liquid column, means to lift liquid from said condensing vessel to the top of said liquid column including a riser pipe and a connection for flow of vapor from the vapor space of said evaporator to said riser pipe, and a vapor return line from the top of the liquid column to said condensing vessel, whereby said liquid column creates a pressure difference to cause rise of liquid in the riser pipe.

15. Refrigeration system comprising a closed conduit including a circulation path for a refrigerant passing through a cycle involving a change of state, characterized by the absence of a compressor, including a condenser and an evaporator in said conduit, and means actuated by pressure in the gas limb of said system for circulating liquid refrigerant from said condenser to said evaporator.

16. Refrigeration system comprising a closed conduit including a circulation path for a refrigerant passing through a cycle involving a change of state, characterized by the absence of a compressor, including a condenser and an evaporator in said conduit, and a gas lift actuated by pressure in the gas limb of said system for circulating liquid refrigerant from said condenser to said evaporator.

17. A method of transferring refrigerating effect from a lower elevation to a higher elevation which consists in utilizing produced refrigerating effect at the lower elevation to condense a confined volatile fluid in heat exchange relation therewith, flowing the condensed fluid to and in heat exchange relation with a space to be refrigerated at the higher elevation and causing said fluid to be vaporized by heat of said space, conducting the vaporized fluid back to be again condensed and thereby completing a circuit for said fluid, generating pressure in the gas limb of said circuit, and producing flow of the condensed fluid in said circuit by said pressure generated in the gas limb of the circuit.

18. A secondary refrigerating system of the type having substantially the same pressure throughout and in which refrigerant is evaporated and condensed simultaneously comprising in combination, an evaporator, a condenser below the evaporator, a conduit connecting the outlet of the evaporator with the inlet of the condenser, a conduit connecting the outlet of the condenser with the inlet of the evaporator, and a pump associated with the second mentioned conduit for lifting liquid refrigerant from the condenser to the evaporator.

19. A secondary refrigerating system of the type having substantially the same pressure throughout and in which refrigerant is evaporated and condensed simultaneously comprising in combination, an evaporator, a condenser below the evaporator, a conduit connecting the outlet of the evaporator with the inlet of the condenser, a conduit connecting the outlet of the condenser with the inlet of the evaporator, and a vapor lift pump associated with the second mentioned conduit for lifting liquid refrigerant from the condenser to the evaporator.

20. A heat transfer closed fluid system partly filled with a volatile liquid and having a portion for evaporation of the volatile liquid at a given elevation, a portion for condensation of the vapor formed in the evaporation portion connected to the evaporation portion and situated at a second elevation below the first elevation, a rising conduit portion adapted to supply liquid upwardly to the evaporation portion, a conduit portion unobstructedly connecting the condensing portion with the rising conduit portion so that vapor in the rising conduit portion causes rise of liquid therein by reaction against a column of liquid condensate, and a primary refrigerant evaporator in heat exchange relation with said condensing portion.

21. A secondary refrigerating system of the type having substantially the same pressure throughout and in which refrigerant is evaporated and condensed simultaneously comprising in combination, an evaporator, a condenser below the evaporator, a conduit connecting the outlet of the evaporator with the inlet of the condenser, a conduit connecting the outlet of the condenser with the inlet of the evaporator, and a pump associated with the second mentioned conduit for lifting liquid refrigerant from the condenser to the evaporator, said second mentioned conduit being always open and unrestricted between the condenser and the pump.

22. A secondary refrigerating system of the type having substantially the same pressure throughout and in which refrigerant is evaporated and condensed simultaneously comprising in combination, an evaporator, a condenser below the evaporator, a conduit connecting the outlet of the evaporator with the inlet of the condenser, a conduit connecting the outlet of the condenser with the inlet of the evaporator, and a vapor lift pump associated with the second mentioned conduit for lifting liquid refrigerant from the condenser to the evaporator, said second mentioned conduit being always open and unrestricted between the condenser and the vapor lift pump.

23. A secondary refrigerating system of the type having substantially the same pressure throughout and in which refrigerant is evaporated and condensed simultaneously comprising in combination, an evaporator, a condenser below the evaporator, a conduit connecting the outlet of the evaporator with the inlet of the condenser, a conduit connecting the outlet of the condenser with the inlet of the evaporator, and a heat operated pump operable by vapor under pressure produced by heat absorption into the system associated with the second mentioned conduit for lifting liquid refrigerant from the condenser to the evaporator.

DONALD B. KNIGHT.